United States Patent
Dinger et al.

(10) Patent No.: US 9,239,988 B2
(45) Date of Patent: *Jan. 19, 2016

(54) NETWORK EVENT MANAGEMENT

(71) Applicant: International Business Machines Corporation, Armonk, NY (US)

(72) Inventors: John Dinger, Cary, NC (US); David R. Franklin, London (GB); Kristian J. Stewart, Surrey (GB); John M. Lake, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/478,224

(22) Filed: Sep. 5, 2014

(65) Prior Publication Data

US 2015/0032888 A1 Jan. 29, 2015

Related U.S. Application Data

(63) Continuation of application No. 13/821,245, filed as application No. PCT/IB2012/050451 on Jan. 31, 2012.

(30) Foreign Application Priority Data

Feb. 24, 2011 (EP) ..................................... 11155862

(51) Int. Cl.
G06F 15/173 (2006.01)
G06N 5/04 (2006.01)
(Continued)

(52) U.S. Cl.
CPC *G06N 5/04* (2013.01); *H04L 41/06* (2013.01); *H04L 43/0876* (2013.01)

(58) Field of Classification Search
CPC . H04L 41/069; H04L 41/147; H04L 43/0876; H04L 45/32
See application file for complete search history.

(56) References Cited

U.S. PATENT DOCUMENTS 6,301,624 B1 10/2001 Lee et al.
6,701,449 B1 3/2004 Davis et al.
(Continued)

FOREIGN PATENT DOCUMENTS

CN 1614936 A 5/2005
CN 1617512 A 5/2005
(Continued)

OTHER PUBLICATIONS

Liu et al., "Research on Forecast Method of Fuel Consumption in Highway Traffic Transportation System", 2010 ETP/ IITA Conference on System Science and Simulation in Engineering (SSSE 2010), Jun. 29-Jul. 1, 2010, © 2010 ETP, pp. 214-217.

(Continued)

*Primary Examiner* — June Sison
(74) *Attorney, Agent, or Firm* — Maeve L. McCarthy; Jason H. Sosa

(57) ABSTRACT

An apparatus for predicting a network event flood comprises an event rate detector for detecting rates of event emissions from one or more devices; an aggregator for producing an aggregate rate and an aggregate rate trend of the rates of event emissions from a plurality of the devices; a level generator for generating a plurality of levels comprising maximum acceptable event rate values of a plurality of the aggregate rate trends over plural time periods; a storage component for storing the plurality of levels; a comparator for comparing a current aggregate rate trend with at least a selected one of the levels; and a signaller for signalling a predicted event flood responsive to the comparator detecting that the current aggregate rate trend will exceed the at least a selected one of the levels at a first point in time.

16 Claims, 5 Drawing Sheets

(51) Int. Cl.
*H04L 12/26* (2006.01)
*H04L 12/24* (2006.01)

(56) References Cited

U.S. PATENT DOCUMENTS

| | | | |
|---|---|---|---|
| 6,754,854 B2 | 6/2004 | Kurrasch | |
| 7,539,752 B1 | 5/2009 | Chakravarti et al. | |
| 7,739,143 B1* | 6/2010 | Dwarakanath et al. | 705/7.31 |
| 7,774,651 B2 | 8/2010 | Mukherjee et al. | |
| 2008/0034258 A1 | 2/2008 | Moriya et al. | |
| 2008/0250265 A1* | 10/2008 | Chang et al. | 714/4 |
| 2009/0216624 A1* | 8/2009 | Kato | 705/10 |
| 2010/0052924 A1 | 3/2010 | Bajpay et al. | |
| 2010/0083054 A1* | 4/2010 | Marvasti | 714/47 |
| 2011/0010209 A1* | 1/2011 | McNally | 705/7 |
| 2011/0087517 A1* | 4/2011 | Abbott | 705/7.28 |
| 2011/0119374 A1* | 5/2011 | Ruhl et al. | 709/224 |
| 2011/0246837 A1* | 10/2011 | Kato | 714/47.1 |
| 2013/0166745 A1 | 6/2013 | Dinger et al. | |

FOREIGN PATENT DOCUMENTS

| | | |
|---|---|---|
| CN | 101083563 A | 12/2007 |
| CN | 101924603 A | 12/2010 |
| EP | 11155862.3 | 2/2011 |
| JP | H08167900 A | 6/1996 |
| JP | H11177549 A | 7/1997 |
| JP | H10336276 A | 12/1998 |
| JP | 2001084195 A | 3/2001 |
| JP | 2005094361 A | 4/2005 |
| JP | 2006238043 A | 9/2006 |
| JP | 2010539572 A | 12/2010 |
| WO | 2012114215 A1 | 8/2012 |

OTHER PUBLICATIONS

Yong et al., "Survey on congestion control for DTN", School of Computer, National University of Defense Technology, China, 1 page, downloaded May 11, 2015.

* cited by examiner

NETWORK EVENT MANAGEMENT

FILED OF THE INVENTION

The present invention relates to the field of network event management. In particular, the invention relates to an apparatus and method for predicting a network event flood and protecting the network from such a predicted flood.

BACKGROUND

There are a number of network management systems available. These systems gather fault information from disparate devices across a network and then correlate, categorize, prioritize and present this information in a form that allows an operator to manage the network and repair it efficiently. In addition, basic predictive statistical analytic techniques have been applied to operational data gathered from network devices to predict potential future problems.

Network management involves gathering data from a range of devices in a network. Known implementations use a large variety of monitoring devices such as probes or agents to perform this task which can provide a large amount of source data from many types of network devices and systems.

One of the problems with managing very large networks is that there are network failure modes that can result in a very large number of fault events, particularly when a network cascade failure occurs. The high number of fault events can flood the network management system, making it unresponsive and rendering it difficult for an operator to isolate the original cause of the failure or prioritize the repair effort efficiently. In existing solutions a monitoring probe (that may gather data from multiple devices) can initiate a shutdown once the fault event rate exceeds a given threshold, and then initiate a restart once the level drops back below the threshold. However, by this point a cascade failure has often already started to occur, and many other devices may have started to flood the management system. There will typically also already be a large number of fault events resident in the system before this basic form of flood protection is activated. Disadvantageously, this solution also results in a large amount of data loss including information that may be vital to fixing the network. Furthermore, if the probe is monitoring multiple devices, then all data from all devices is lost even if only one of them is producing the event flood. Finally intelligent central administration of how probes manage a data flood is not possible.

For example, U.S. Pat. No. 7,539,752 discloses detecting event numbers exceeding a fixed threshold and causing the number of events permitted to be throttled back. As a further example, United States Patent Application No. 20100052924 discloses detecting event numbers exceeding a fixed threshold and causing event information to be buffered. This means that information becomes unavailable for managing the system during the event flooding incident.

Existing predictive analytic systems often concentrate on device metrics that display a simple progression before the device develops a fault condition. For example, fitting a linear trend to disk space or central processing unit (CPU) usage to predict a future problem, or performing an historical analysis of these metrics to indicate abnormal usage. Again, in each case, the predictive data relies on a fixed threshold to determine the abnormality, and these systems cannot take a flexible approach to device-specific fault event rates, as this metric is much harder to gather and analyze.

Therefore, there is a need to address the aforementioned problems in network systems according to the present state of the art.

SUMMARY

The present invention accordingly provides, in a first aspect, an apparatus for predicting a network event flood comprising: an event rate detector for detecting rates of event emissions from one or more devices; an aggregator for producing an aggregate rate and an aggregate rate trend of said rates of event emissions from a plurality of said devices; a level generator for generating a plurality of levels comprising maximum acceptable event rate values of a plurality of said aggregate rate trends over plural time periods; a storage component for storing said plurality of levels; a comparator for comparing a current aggregate rate trend with at least a selected one of said levels; and a signaller for signalling a predicted event flood responsive to said comparator detecting that said current aggregate rate trend will exceed said at least a selected one of said levels at a first point in time.

Preferably, said aggregator comprises an average for calculating an average event rate. Preferably, said aggregator comprises a statistical calculator for calculating a statistically-normalized aggregate rate or rate trend. Preferably, said statistically-normalized aggregate rate or rate trend defines a normalized trend. Preferably, said normalized trend is calculated by a least-squares method. Preferably, said plural time periods are defined according to one or more of: times of day; days of week; days of month; or days of year.

The apparatus may further comprise an ordering component responsive to said signaller for ordering a list of identifiers of said devices in descending order from a device having at said first point in time a maximum rate of event emissions to a device having at said first point in time a minimum rate of event emissions. The apparatus may further comprise a first selector for selecting said device from said list having at said first point in time a maximum rate of event emissions and identifying said device as a candidate device for placing in a flood protection mode. Preferably, said flood protection mode causes a receiver to accept a reduced rate of event emissions from said device. Preferably, said receiver comprises a network monitor. Preferably, said network monitor comprises a probe. The apparatus according to any of claims 8 to 11, further comprising a flood protection control component for placing said candidate device in said flood protection mode as a flood protected device. The apparatus may further comprise a second selector for selecting a flood protected device having at a second point in time a minimum rate of event emissions and identifying said device as a candidate device for removal from said flood protection mode.

In a second aspect, there is provided a method for predicting a network event flood comprising: detecting, by an event rate detector, rates of event emissions from one or more devices; producing, by an aggregator, an aggregate rate and an aggregate rate trend of said rates of event emissions from a plurality of said devices; generating, by a level generator, a plurality of levels comprising maximum acceptable event rate values of a plurality of said aggregate rate trends over plural time periods; storing, by a storage component, said plurality of levels; comparing, by a comparator, a current aggregate rate trend with at least a selected one of said levels; and signalling, by a signaller, a predicted event flood responsive to said comparator detecting that said current aggregate rate trend will exceed said at least a selected one of said levels at a first point in time.

Preferably, said step of aggregating comprises using an average for calculating an average event rate. Preferably, said step of aggregating comprises using a statistical calculator for calculating a statistically-normalized aggregate rate or rate trend. Preferably, said statistically-normalized aggregate rate or rate trend defines a normalized trend. Preferably, said normalized trend is calculated by a least-squares method. Preferably, said plural time periods are defined according to one or more of: times of day; days of week; days of month; or days of year. The method may further comprise a step of: responsive to said signaller, ordering by an ordering component a list of identifiers of said devices in descending order from a device having at said first point in time a maximum rate of event emissions to a device having at said first point in time a minimum rate of event emissions. The method may further comprise a step of selecting said device from said list having at said first point in time a maximum rate of event emissions and identifying said device as a candidate device for placing in a flood protection mode. Preferably, said flood protection mode causes a receiver to accept a reduced rate of event emissions from said device. Preferably, said receiver comprises a network monitor. Preferably, said network monitor comprises a probe.

The method may further comprise a step performed by a flood protection control component of placing said candidate device in said flood protection mode as a flood protected device. The method may further comprise selecting a flood protected device having at a second point in time a minimum rate of event emissions and identifying said device as a candidate device for removal from said flood protection mode.

In a third aspect, there is provided a computer program comprising computer program code stored on a computer-readable medium to, when loaded into a computer system and executed thereon, cause said computer system to perform all the steps of a method according to the second aspect.

BRIEF DESCRIPTION OF THE DRAWINGS

A preferred embodiment of the present invention will now be described, by way of example only, with reference to the figures in which.

DETAILED DESCRIPTION

Figure 1:
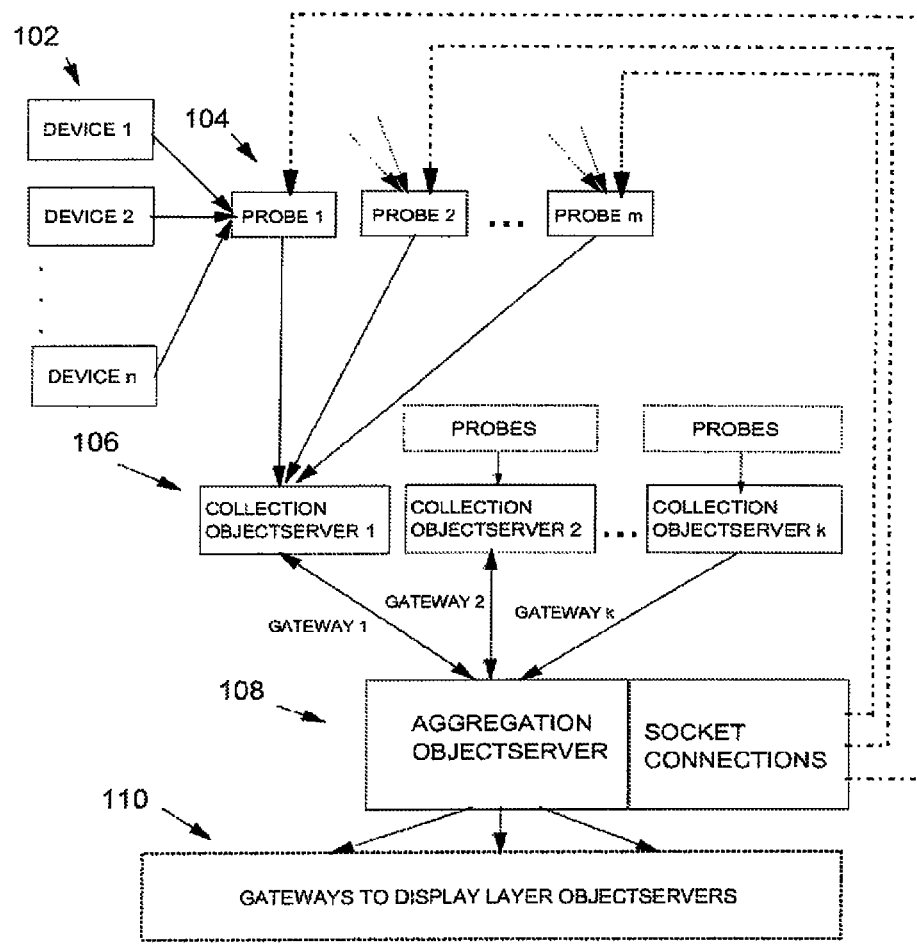
FIG. 1 shows a diagram of an exemplary multi-tiered network event management system suitable for the implementation of a preferred embodiment of the present invention.

FIG. 1 shows a diagram of an exemplary multi-tiered network event management system 100 suitable for the implementation of a preferred embodiment of the present invention.

The devices being monitored are shOWn at 102; in the present example, the devices 102 (DEVICE!, DEVICE2 . . . DEVICE n) are being monitored by PROBE 1.

PROBE 1 is one of the set of probes 104 (PROBE 1, PROBE 2 . . . PROBE m) that monitor the raw fault data, turn it into normalized fault events and send it to the collection layer of ObjectServers 106.

The collection layer is also the layer where device specific flood protection can be turned on or off. Layer 106 is the layer of collection ObjectServers (COLLECTION OBJECTSERVER 1, COLLECTION OBJECTSERVER 2 . . . COLLECTION OBJECTSERVER k).

Aggregation ObjectServer 108 is the layer of the network management system that would be most adversely affected by an event flood, so this is the one that controls the probes via the socket based communications system.

The display layer of ObjectServers is not shown in detail, but the gateways to the display layer are presented at 110. The display layer ObjectServers feed data to the Event Lists that allow the operators to interact with the fault data.

In a single ObjectServer system, the probes both feed data to the ObjectServer and are controlled by it.

In a preferred embodiment according to the present invention, device-specific fault event rate data is gathered centrally. This data is summarized and stored in order to build up an historical database of device event rates. This historical data is analyzed using both a linear trend algorithm and an algorithm that produces a baseline of previous usage. The same analysis is also performed for the overall network event rate by summing all the individual device event rates. This process permits the establishment of one or more levels, which can take into account variations according to, for example, times of the day, days of the week, days of the month, or even larger time period variabilities, such as seasonal variations in the amount of event traffic.

Figure 2:
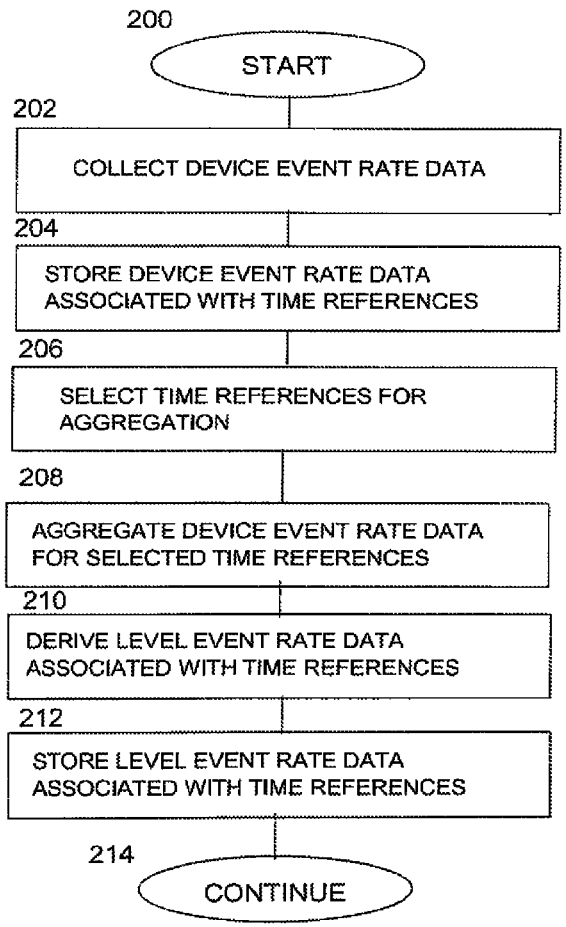
FIG. 2 shows in simplified flowchart form a method of creating a level according to one embodiment of the present invention.

Turning to FIG. 2, there is shown in simplified flowchart form a method of creating such a level according to one embodiment of the present invention.

After START step 200, at 202, device event rate data is collected. This activity may be performed over a protracted period to extract an appropriately large quantity of event rate data representative of the event rates as they vary with time in the manner just described. At 204, the device event rate data is stored, for example in a data store such as a database, each sample of the data being associated with a time reference. One or more time references for aggregation of device event rate data are selected at 206. As a concrete example, the time reference selected for device event rate aggregation might be a time of day reference, or a day of the week reference, or the like, as described above. At 208, the device event rate data for the selected one or more time references is aggregated to give a system-wide event rate, from which, at 210, a level (such as a baseline, a threshold or a historical maximum acceptable level), of event rate data is derived and associated with the one or more time references. The level event rate data associated with the one or more time references is stored at 212, and the system continues with other processing at CONTINUE step 214.

This event rate data is used to trend the event rate data and produce event information predictive of potential future problems with a particular device. It is also used to take an historical baseline of previous activity and display a fault event if activity changes significantly. Finally, the overall event rate is trended to determine if there is likely to be an event storm building, before it overwhelms the fault event management system. The specific device event rate trends are then used to automatically put event feeds from those devices into reduced event rate flood protection mode. Once the predicted event flood has been avoided, then the same techniques in reverse can be used to restore device event feeds to normal operation.

The controlling ObjectServer runs an automated process that adds up the change in tally of all fault events from a particular device resident in the ObjectServer. Devices are identified by node, i.e. the host name on the network. This gives an event rate per device over the sample period (which may be, for example, every 5 minutes). Even when a device is placed in flood protection mode, the reduced number of events have increased tally counts that reflect the number of incoming events at the probe. This means that the event rate calculation remains accurate for the number of fault events generated by the device, whatever the flood protection state at the probe.

The event rates per device are stored along with a time stamp. This historical record is then analyzed in the following ways:

Firstly, a least-squared line fit or another statistical fit method is used to approximate the device event rate trend. If the linear trend indicates that it will exceed an acceptable (configurable) threshold within a given time in the future (1 week, for example), then a predictive fault event will be displayed in the network management system so that an operator can prioritize remedial action for this device. This identifies that there are an escalating number of fault events coming from a particular device and alerts the operator of this.

Secondly, the event rates from the same time on the same day of the week for a device are averaged to produce an historical level. A minimum of two extended periods, such as weeks, of data is needed to initially build up this level. As will be clear to one of ordinary skill in the art, the number of weeks' data that is averaged is configurable. If the device fault event rate differs from the historical level for this device by a configurable amount, then a fault event will be displayed in the network management system so that an operator can prioritize remedial action for this device. This test is also referred to as a "corridor of normality" and is based on the principle that similar behavior can be expected in a system at the same time and day of the week, month, etc. In this application the level itself can also be used as a tool to improve the network, as it will show if the same devices are failing at the same time during each period. This can help an operator pinpoint the cause of the problem. A typical example where this might be useful is where devices are shut down over the weekend and brought up at the same time on a Monday morning—this in turn causes network fault events which can normally be safely ignored. If the machine fails to come up then it can have disastrous consequences and the level variation will quickly identify this.

As will be clear to one of ordinary skill in the art, the comparison of a current trend against a baseline or historical maximum may be iterative, in that several baseline or historical maximum measurements of relevance to a particular temporal situation may be established, or it may be necessary to apply some additional heuristic to the selection of the appropriate level in any particular case. Take, for example, a working week that begins on Monday January 1st after a network shutdown covering a holiday period. There may be, in a system according to the preferred embodiment, a first level for Mondays, a second level for the first day of a working week, and a third level for a first day of the month. In this circumstance, a refinement of the preferred embodiment of the present invention applies rules to select the appropriate level or historical maximum for use. The rule may, for example, be to select the lowest level to determine the threshold value. Many alternative arrangements will be clear to one of ordinary skill in the art.

Figure 3:
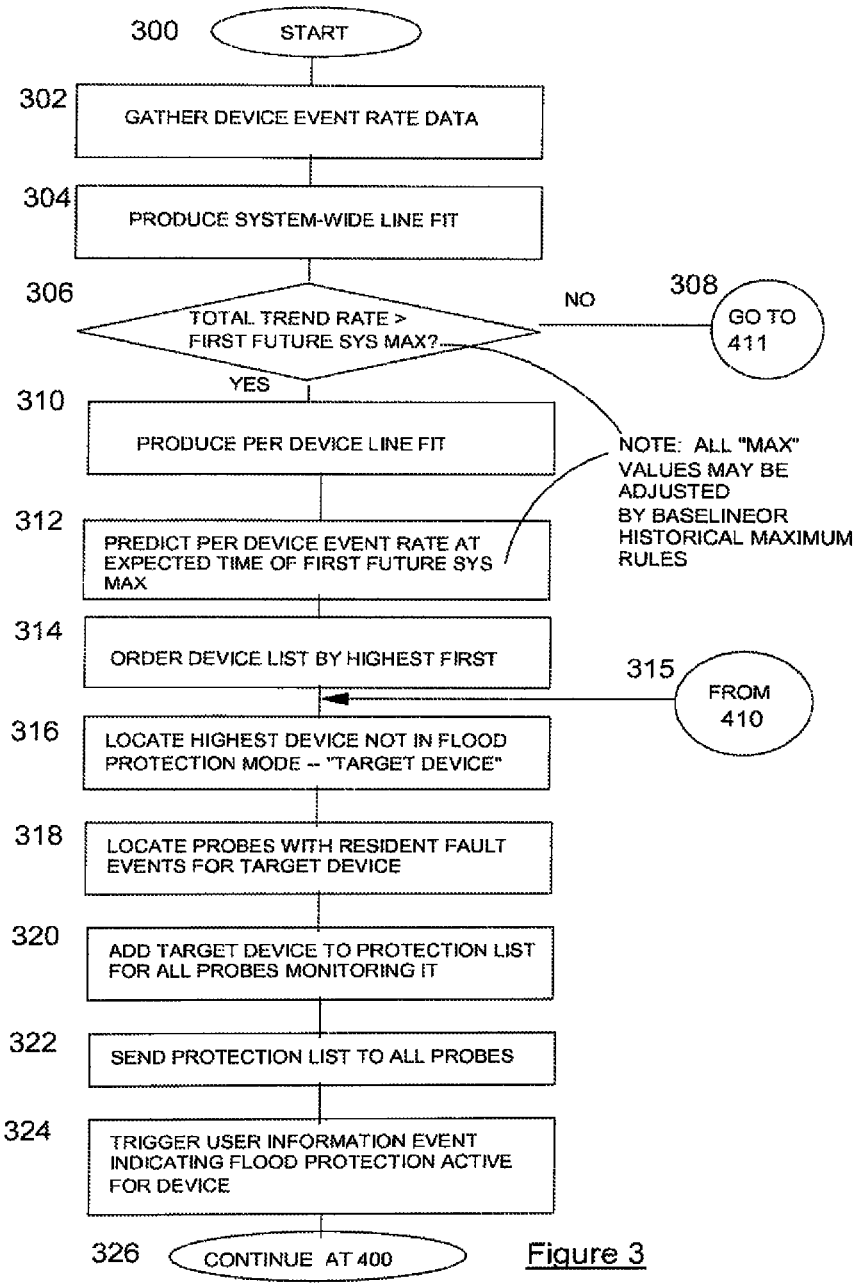
FIGS. 3 and 4 in combination show in simplified flowchart form an exemplary method of addressing the problem of potential event flooding according to one embodiment of the present invention.
Figure 4:
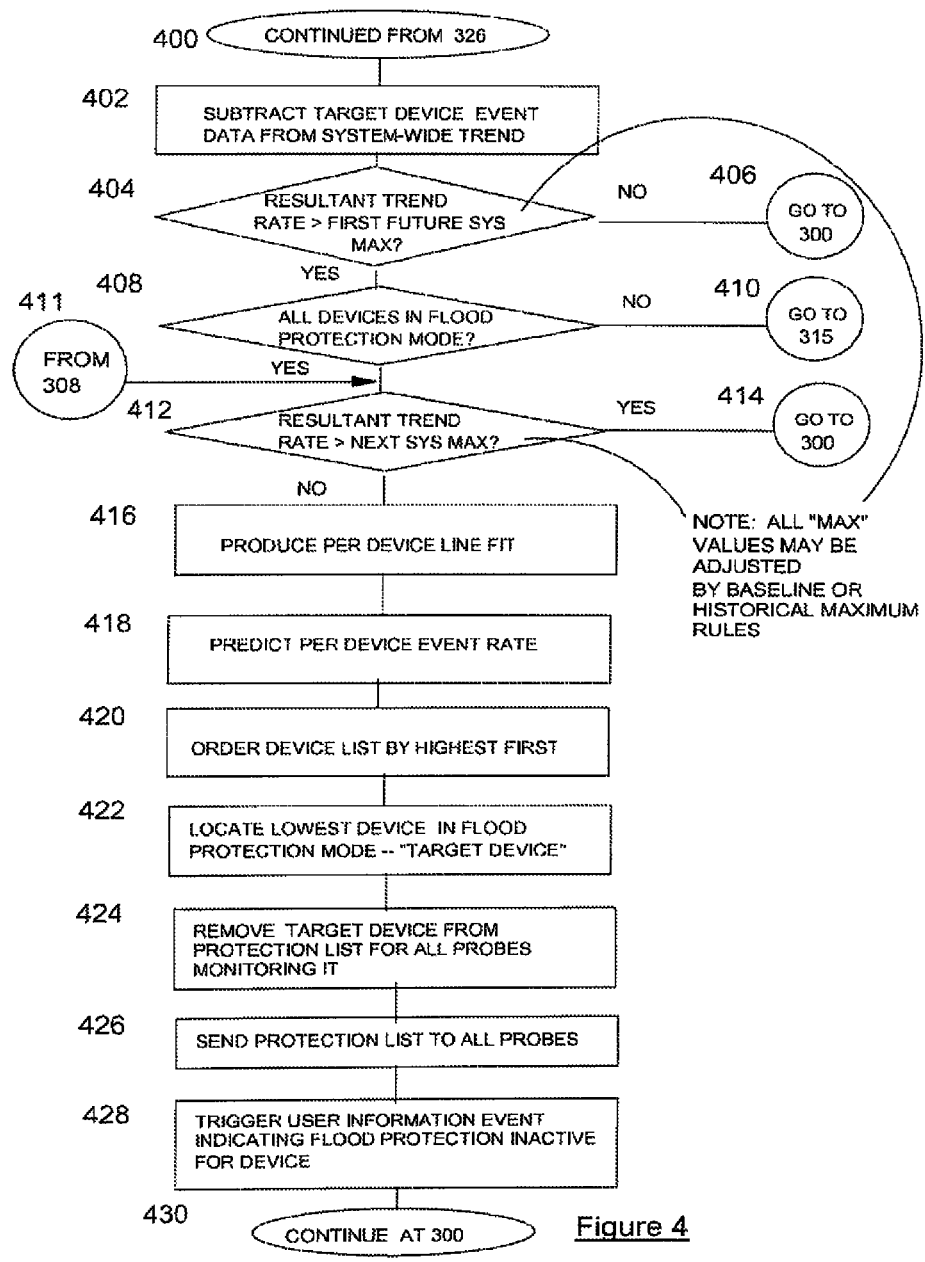

With reference to FIGS. 3 and 4 in combination, there is shown in simplified flowchart form an exemplary method of addressing the problem of potential event flooding according to one embodiment of the present invention.

The method begins at START step 300, and at step 302 device event rate data is gathered. At 304, a system-wide line fit is calculated, preferably using, for example, a least-squares fit. At test step 306, the total trend rate is compared with the first future system maximum. As will be clear to one of ordinary skill in the art, the period related to the first future system maximum may be configured according to the needs of the particular network system. As will be further clear from the foregoing description of the level element of the preferred embodiment, the maximum value here will have been selected from one or more level values according to the applicable rules for selection. If the outcome of the comparison is negative, the process continues at step 411. If the response is positive, at step 310, a line fit is produced for each device, and at step 312, this value is used to predict the per device event rate at the expected time of the first future system maximum overall event rate. At step 314, the value derived for each device at step 312 is used to produce a list of devices in descending order from the device with the maximum per device event rate at the expected time of the first future system maximum overall event rate to the device with the minimum per device event rate at the expected time of the first future system maximum overall event rate. At step 316, the highest device not in flood protection mode (the "target device") is identified from the list. At step 318, all probes having resident fault events for the target device are located, and at step 320 the target device is added to the flood protection list for each such probe that is monitoring that device. At step 322, the protection list is sent to all probes, and step 324, a user event is triggered to alert the system user that flood protection has been activated for the device.

The process continues in FIG. 4, at step 400. At step 402, the target device event data is removed from the system wide trend calculation to provide a new calculation, and at test step 404, the resultant trend rate for the system is compared with the first future system maximum. If the determination at test step 404 is negative, the process returns to START step 300. If the outcome of test step 404 is positive, at test step 408, a determination is made whether all devices are already in flood protection mode. If the determination is negative, the process returns to step 315. If the determination is positive, at test step 412, a further test is performed to determine if the resultant trend rate derived at step 402 is greater than the next future system maximum. If the determination is positive, the process returns to START step 300. If the determination is negative, at step 416 a per device line fit is calculated, and at step 418, the per device event rate is predicted over the short term. The value derived for each device is used to produce a list of devices in descending order from the device with the maximum per device event rate to the device with the minimum per device event rate, and at step 422, the lowest device in the list which is in flood protection mode is located and becomes the target device. At step 424, the target device is removed from the protection list for all probes that are monitoring it, and at step 426, the protection list is sent to all probes. At step 428, a user event is triggered to inform the system user that flood protection has now been made inactive for the device, and at step 430, the process returns to START step 300.

The following pseudo-code specification describes, in more detail and in terms and structures familiar to one of ordinary skill in the art, how the intelligent flood control algorithm works in an exemplary system having its short-term period set at 24 hours, and its longer term period set at 48 hours.

1. Wait for a configurable number of event rate sample periods.
2. Produce a least-squared line fit of the sum of the entire event rate data over the last 24 hours*.
3. Does the trend predict that the total event rate will exceed the maximum, adjusted according to a selected baseline, that the ObjectServer can process within the next 24 hours*?
4. If not, go to 17.
5. Produce a least-squared fit of the event rate data for each device.
6. Calculate the predicted event rate for each device at the time when the overall event rate will exceed the maximum, adjusted according to a selected baseline, that the ObjectServer can process.
7. Produce a list of devices sorted on the predicted event rate. First is highest.
8. Find the first device that is not already in flood protection mode.
9. Find all probes that have produced resident fault events for this device using resident events.
10. Add the device name to the flood protection list for all probes that monitor the device.
11. Send the flood protection list(s) to the probe(s).
12 Produce an event to indicate that the device has been put in flood protection mode so the user knows what the system has done automatically.
13. Subtract the device event rate from the total event rate least-squared trend.
14. Does the new trend predict that the total event rate will exceed the maximum, adjusted according to a selected baseline, that the ObjectServer can process within the next 24 hours*?
15. If yes, and all devices are not in flood protection mode, go to 8.
16. go to 1.
17. Does the trend predict that the total event rate will exceed the maximum, adjusted according to a selected baseline, that the ObjectServer can process within the next 48 hours*?
18. If yes go to 1.
19. Produce a least-squared fit of the event rate data for each device.
20. Calculate the predicted event rate for each device in 24 hours time*.
21. Produce a list of devices sorted on the predicted event rate. First is highest.
22. Find the last device in the list that is in flood protection mode.
23. Remove the device name from the flood protection list for all probes that monitor the device. Use the probes found for this device during step 9.
24. Send the flood protection list(s) to the probe(s).
25. Produce a resolution event to indicate that the device has been taken out of flood protection mode, so the user knows what the system has done automatically.
26. go to 1.
*The number of hours can be configured.

Figure 5:
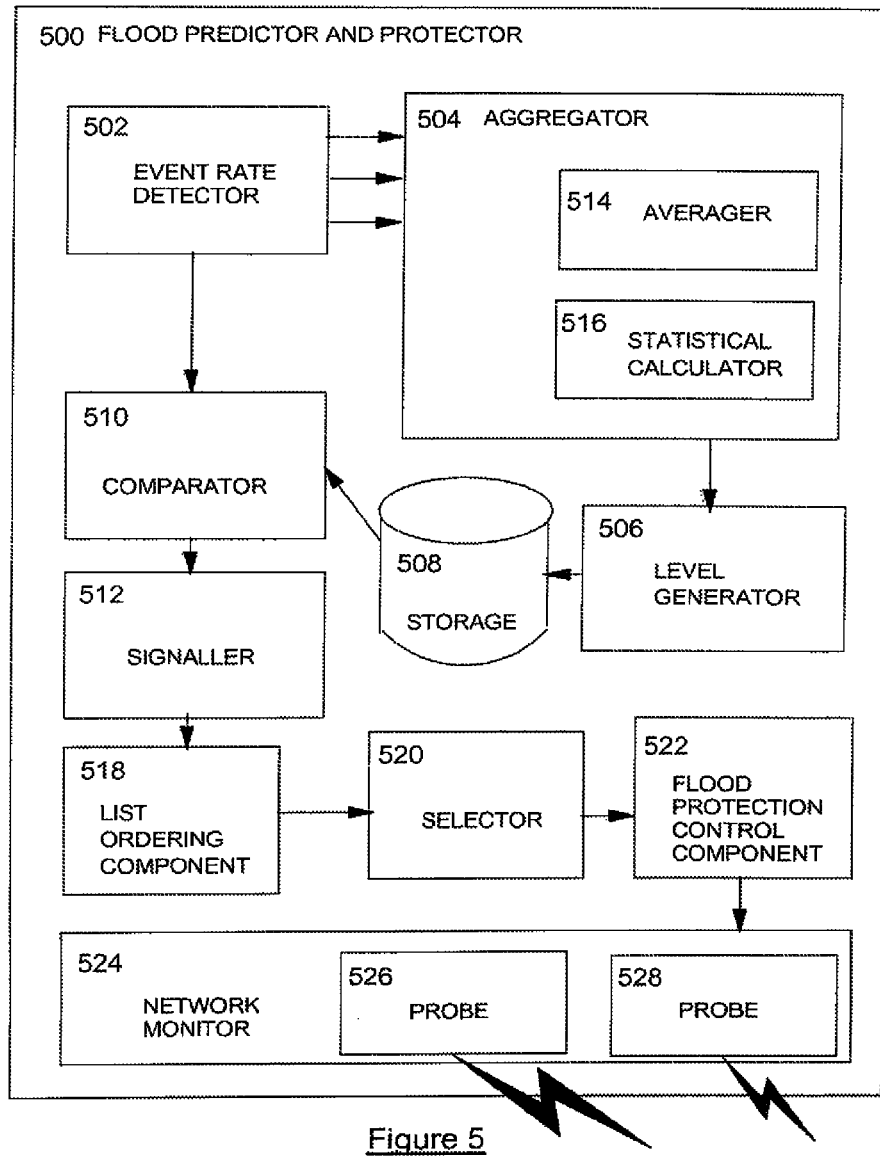
FIG. 5 shows in simplified schematic form an apparatus or logic arrangement, such as may be embodied in hardware, for example a field-programmable gate array or application-specific device, or in firmware arranged to control a device, according to an embodiment of the present invention.

Turning to FIG. 5, there is shown an apparatus or logic arrangement, such as may be embodied in hardware, for example a field-programmable gate array or application-specific device, or in firmware arranged to control a device, according to an embodiment of the present invention.

The apparatus of FIG. 5 comprises a network flood predictor and protector mechanism 500 having an event rate detector 502 which provides event rate data to aggregator 504.

Aggregator 504 aggregates the data, preferably by means of average 514 and statistical calculator 516, and provides the aggregated data to level generator 506. Level generator 506 stores its generated levels in storage 508. Comparator 510 is adapted to receive current event rate data from event rate detector 502 and to compare it with one or more of the levels from storage 408. On the result of the comparison produced by comparator 510 indicating a predicted event flood, signaller 512 is prompted to signal to the components comprising the flood protector part of mechanism 500, by initiating action at list ordering component 518 to produce an ordered list of devices according to criteria indicating their relative expected contribution to the predicted event flood. List ordering component 518 provides its ordered list to selector 520, which selects the device or devices to be placed in flood protection mode and causes flood protection control component 522 to issue the appropriate commands to network monitor 524. Network monitor 524 in turn controls the acceptance of events at probes 526, 528, etc.

Thus, if the linear trend for the overall system indicates that the network management system will be overwhelmed by a flood of data in the next 24 hours (this can be configured for different time periods), then the trends for each device are analyzed to find the device that is providing the greatest contribution to this future flood. The probe monitoring this device is then sent an instruction to reduce the rate of data from this device, and a fault event is displayed in the network management system to indicate the change.

The overall system trend analysis is then repeated without including the device in the calculation. If removing this device from the overall system still results in a future trend that will overwhelm the system within a given time frame, then the device which is predicted to produce the next highest contribution to the flood will be put into event reduction mode. This process is repeated until the overall network management system is in a state in which it will no longer be flooded by the predicted cascade failure.

Event rate data is gathered from all network devices, whether they have been put into flood protection mode or not. If the overall trend indicates the overall system will not be flooded within a longer term period, say 48 hours, then fault event data from a device in flood protection mode is restored to normal operation. Device fault events are restored so that the ones with the lowest event rate trends are returned to normal operation first. A resolution event indicating the change is added to the management system. The reason a longer prediction period is used than when adding devices to flood protection mode is to ensure that devices are not constantly switched in and out of protection mode when there are slight fluctuations in the overall trend.

Preferred embodiments of the present invention ensure that the network management system automatically and intelligently manages how much data it is capable of processing. This ensures that the network management system remains responsive, informative and useful, even under extreme event flood conditions.

It will be clear to one of ordinary skill in the art that all or part of the method of the preferred embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

It will be equally clear to one of skill in the art that all or part of a logic arrangement according to the preferred embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It will be appreciated that the method and arrangement described above may also suitably be carried out fully or partially in software running on one or more processors (not shown in the figures), and that the software may be provided in the form of one or more computer program elements carried on any suitable data-carrier (also not shown in the figures) such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

In one alternative, the preferred embodiment of the present invention may be realized in the form of a computer implemented method of deploying a service comprising steps of deploying computer program code operable to, when deployed into a computer infrastructure and executed thereon, cause said computer system to perform all the steps of the method.

In a further alternative, the preferred embodiment of the present invention may be realized in the form of a data carrier having functional data thereon, said functional data comprising functional computer data structures to, when loaded into a computer system and operated upon thereby, enable said computer system to perform all the steps of the method.

It will be clear to one skilled in the art that many improvements and modifications can be made to the foregoing exemplary embodiment without departing from the scope of the present invention.

What is claimed is:

1. A method for predicting a network event flood, the method comprising the steps of:
    detecting, by an event rate detector, rates of event emissions from one or more devices, wherein each rate of emissions is stored per device with an associated time stamp;
    producing, by an aggregator, an aggregate rate and an aggregate rate trend of said rates of event emissions from a plurality of said devices;
    generating, by a level generator, a plurality of levels comprising maximum acceptable event rate values of a plurality of said aggregate rate trends over plural time periods;
    storing, by a storage component, said plurality of levels;
    comparing, by a comparator, a current aggregate rate trend for at least one of the one or more devices with one or more of said levels, wherein the comparing is iterative to each one of the one or more of said levels;
    detecting whether said current aggregate rate trend will exceed one of the one or more of said levels at a first point in time; and
    signalling, by a signaller, a predicted event flood responsive to said comparator detecting that said current aggregate rate trend will exceed one of the one or more of said levels at a first point in time.

2. The method according to claim 1 wherein said step of producing an aggregate rate comprises using an average for calculating an average event rate.

3. The method according to claim 1 wherein said step of producing an aggregate rate comprises using a statistical calculator for calculating a statistically-normalized aggregate rate or rate trend.

4. The method according to claim 3 wherein said statistically-normalized aggregate rate or rate trend defines a normalized trend.

5. The method according to claim 4 wherein said normalized trend is calculated by a least-squares method.

6. The method according to claim 1 wherein said plural time periods are defined according to one or more of: times of day; days of week; days of month; or days of year.

7. The method according to claim 1, further comprising the step of: responsive to said signaller, ordering by an ordering component a list of identifiers of said devices in descending order from a device having at said first point in time a maximum rate of event emissions to a device having at said first point in time a minimum rate of event emissions.

8. The method according to claim 7, further comprising the step of selecting said device from said list having at said first point in time a maximum rate of event emissions and identifying said device as a candidate device for placing in a flood protection mode.

9. The method according to claim 8, wherein said flood protection mode causes a receiver to accept a reduced rate of event emissions from said device.

10. The method according to claim 9, wherein said receiver comprises a network monitor.

11. The method according to claim 10, wherein said network monitor comprises a probe.

12. The method according to claim 8, further comprising placing, by a flood protection control component, said candidate device in said flood protection mode as a flood protected device.

13. The method according to claim 12, further comprising the step of:

selecting a flood protected device having at a second point in time a minimum rate of event emissions and identifying said device as a candidate device for removal from said flood protection mode.

14. The method according to claim 1, wherein said comparing a current aggregate rate trend with one or more of said levels further comprises applying a set of rules to select one of the one or more of said levels.

15. The method according to claim 8, further comprising alerting a user said device is the candidate device for placing in a flood protection mode.

16. The method according to claim 1, further comprising, responsive to detecting said current aggregate rate trend will exceed one of the one or more of said levels at a first point in time:

determining the at least one device corresponding to said current aggregate rate trend; and placing, automatically, an event feed for the at least one device into a flood protection mode.

\* \* \* \* \*